(12) United States Patent
Yanagawa et al.

(10) Patent No.: US 10,899,313 B2
(45) Date of Patent: Jan. 26, 2021

(54) WEBBING TAKE-UP DEVICE

(71) Applicant: KABUSHIKI KAISHA TOKAI-RIKA-DENKI-SEISAKUSHO, Aichi (JP)

(72) Inventors: Wataru Yanagawa, Aichi (JP); Shinichi Okubo, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 31 days.

(21) Appl. No.: 16/306,357

(22) PCT Filed: Jun. 8, 2017

(86) PCT No.: PCT/JP2017/021373
§ 371 (c)(1),
(2) Date: Nov. 30, 2018

(87) PCT Pub. No.: WO2017/213239
PCT Pub. Date: Dec. 14, 2017

(65) Prior Publication Data
US 2019/0299923 A1 Oct. 3, 2019

(30) Foreign Application Priority Data
Jun. 9, 2016 (JP) .................................. 2016-115595

(51) Int. Cl.
*B60R 22/46* (2006.01)
(52) U.S. Cl.
CPC .................................. *B60R 22/46* (2013.01)

(58) Field of Classification Search
CPC ............................ B60R 22/46; B60R 22/4633
See application file for complete search history.

(56) References Cited

U.S. PATENT DOCUMENTS

| 4,444,010 A * | 4/1984 | Bendler .............. B60R 22/4628 242/374 |
| 2014/0145020 A1 | 5/2014 | Gentner et al. |

(Continued)

FOREIGN PATENT DOCUMENTS

JP 2014-500178 A 1/2014

OTHER PUBLICATIONS

International Search Report and Written Opinion issued in corresponding International Application No. PCT/JP2017/021373 dated Sep. 12, 2017.

*Primary Examiner* — Sang K Kim
(74) *Attorney, Agent, or Firm* — Roberts Calderon Safran & Cole P.C.

(57) ABSTRACT

A webbing take-up device is provided with (i) a spool and (ii) a rotor rotatable integrally with the spool having a base portion and radially-extending engaging teeth. A webbing to be applied to a vehicle occupant is wound around the spool. Each engaging tooth protrudes from the base portion in a rotation axis direction of the spool, and is tapered along the rotation axis direction such that a thickness dimension in a rotation circumference direction of the spool of a portion of the engaging tooth at the opposite side thereof from the base portion becomes smaller toward the base portion side thereof. The axially-tapered shape of the engaging teeth reduces stresses and improves transmission efficiency between the rotor teeth and the teeth of a moving member engaged thereto.

7 Claims, 7 Drawing Sheets

(56) References Cited

U.S. PATENT DOCUMENTS

| | | | |
|---|---|---|---|
| 2015/0224960 A1* | 8/2015 | Hertag | B60R 22/4628 242/396.1 |
| 2015/0336538 A1* | 11/2015 | Gray | B60R 22/4628 242/389 |
| 2019/0047510 A1* | 2/2019 | Yanagawa | B60R 22/4628 |
| 2019/0232916 A1* | 8/2019 | Wang | B60R 22/46 |
| 2019/0308585 A1* | 10/2019 | Yanagawa | B60R 22/46 |

* cited by examiner

WEBBING TAKE-UP DEVICE

WEBBING TAKE-UP DEVICE

CROSS-REFERENCE TO RELATED APPLICATIONS

The present application is a U.S. National Phase of PCT/JP2017/021373 filed on Jun. 8, 2017, claiming priority to Japanese Patent Application No. 2016-115595 filed Jun. 9, 2016. The disclosure of the PCT Application is hereby incorporated by reference into the present Application.

TECHNICAL FIELD

The present disclosure relates to a webbing take-up device.

BACKGROUND ART

Japanese Patent Application National Publication No. 2014-500178 discloses a webbing take-up device equipped with a pretensioner mechanism that takes up a webbing onto a spool by rotating the spool in a take-up direction at a time of emergency of a vehicle. In the pretensioner mechanism recited in Japanese Patent Application National Publication No. 2014-500178, the webbing may be taken up onto the spool by a moving member, which is moved by activation of a gas generator, engaging with engaging teeth of a rotor that is rotatable integrally with the spool.

With regard to transmitting kinetic energy of the moving member that is moved by activation of the gas generator to the spool efficiently, it is desirable to reduce resistance when the moving member engages with the engaging teeth of the rotor.

SUMMARY OF INVENTION

Technical Problem

The present disclosure provides a webbing take-up device that may reduce resistance when a moving member engages with engaging teeth of a rotor.

Solution to Problem

A first aspect of the present disclosure is a webbing take-up device including (i) a spool on which a webbing to be applied to a vehicle occupant is taken up as a result of the spool being rotated in a take-up direction, the spool being rotated in a pull-out direction as a result of the webbing being pulled out, and (ii) a rotor that is rotatable integrally with the spool, the rotor including a base portion that extends in rotation radial directions of the spool and an engaging tooth that protrudes from the base portion in a rotation axis direction of the spool, a thickness dimension in a rotation circumference direction of the engaging tooth being configured to be smaller at the opposite side from the base portion than at the side on which the base portion is disposed, the rotor being rotated as a result of a moving member being moved and engaged with the engaging tooth such that the spool is rotated in the take-up direction.

According to the first aspect, the rotor is rotated by the moving member being moved and engaging with the engaging tooth of the rotor. Consequently, the spool is rotated in the take-up direction and the webbing is taken up onto the spool. In this first aspect, the thickness dimension in the rotation circumference direction (the rotation circumference direction of the spool) of the portion of the engaging tooth of the rotor that is at the opposite side thereof from the side at which the base portion is configured to be smaller than the thickness dimension in the rotation circumference direction of the portion of the engaging tooth of the rotor that is at the side at which the base portion is disposed. Therefore, a volume of the moving member that engages with the portion of the engaging tooth at the opposite side of the base portion may be made smaller. As a result, resistance when the moving member is engaging with the engaging tooth of the rotor may be reduced.

In a second aspect of the present disclosure, in the first aspect, an inclination angle relative to the rotation axis direction of a surface of the engaging tooth is configured to be smaller at the side facing in the pull-out direction of the spool than at a side facing in the take-up direction of the spool.

According to the second aspect, kinetic energy of the moving member is transmitted to the rotor by the moving member pushing the surface at the spool pull-out direction side of the engaging tooth. In this second aspect, the inclination angle relative to the spool rotation axis direction of the surface at the spool pull-out direction side of the engaging tooth is configured to be smaller than the inclination angle relative to the spool rotation axis direction of the surface at the spool take-up direction side of the engaging tooth. Consequently, a reduction in a transmission efficiency of kinetic energy from the moving member to the rotor may be suppressed while the resistance when the moving member is engaging with the engaging tooth of the rotor is reduced.

In a third aspect of the present disclosure, in the first aspect or the second aspect, the surface of the engaging tooth at the side facing in the pull-out direction of the spool extends in parallel with the rotation axis direction of the spool.

According to the third aspect, because the surface at the spool pull-out direction side of the engaging tooth extends in parallel with the rotation axis direction of the spool, a reduction in the transmission efficiency of kinetic energy from the moving member to the rotor may be even further suppressed.

In a fourth aspect of the present disclosure, in any of the first to third aspects, the base portion includes a first base portion and a second base portion that are spaced apart in the rotation axis direction of the spool, and the engaging tooth includes a first engaging tooth that protrudes from the first base portion to the second base portion, and a second engaging tooth that protrudes from the second base portion to the first base portion.

According to the fourth aspect, the rotor is rotated by the moving member being moved and engaging with the first engaging tooth and the second engaging tooth. Consequently, the spool is rotated in the take-up direction and the webbing is taken up onto the spool. In this fourth aspect, the thickness dimension in the rotation circumference direction (the rotation circumference direction of the spool) of the portion of the first engaging tooth at the side on which the second base portion is configured to be smaller than the thickness dimension in the rotation circumference direction of the portion of the first engaging tooth at the side on which the first base portion is disposed. Meanwhile, the thickness dimension in the rotation circumference direction (the rotation circumference direction of the spool) of the portion of the second engaging tooth that is at the side on which the first base portion is configured to be smaller than the thickness dimension in the rotation circumference direction of the portion of the second engaging tooth at the side on which the second base portion is disposed. Therefore, a volume of the moving member that engages with the portion of the first engaging tooth at the side thereof at which the second base portion is disposed may be made smaller, and a volume of the moving member that engages with the portion of the second engaging tooth at the side thereof at which the first base portion is disposed may be made smaller. As a result, resistance when the moving member is engaging with the first engaging tooth and the second engaging tooth of the rotor may be reduced.

DESCRIPTION OF EMBODIMENTS

Figure 1:
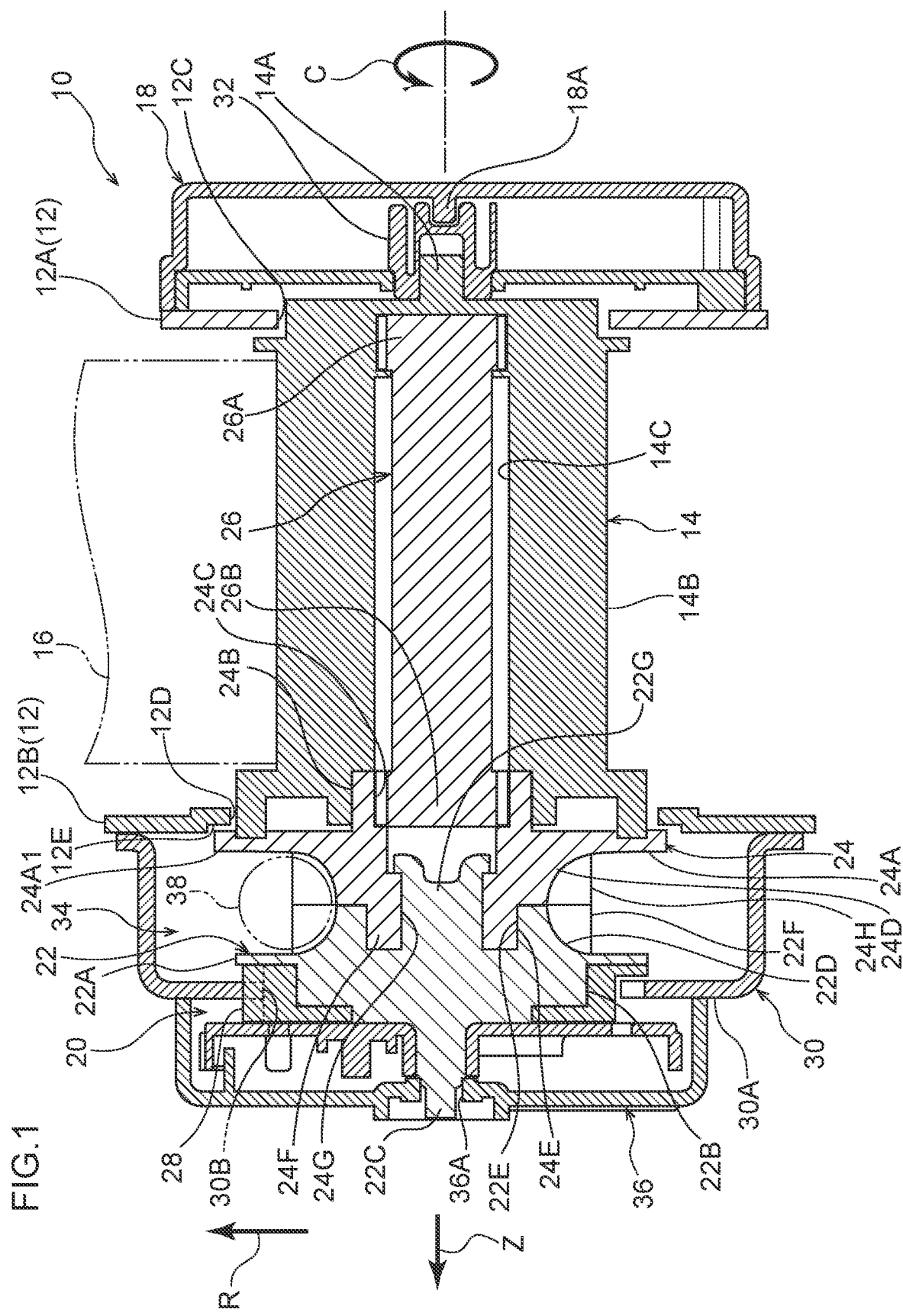
FIG. 1 is a sectional diagram showing a section in which a webbing take-up device is cut along a rotation axis direction of a spool.

A webbing take-up device according to an exemplary embodiment of the present disclosure is described using FIG. 1 to FIG. 5. The directions of arrow Z, arrow R and arrow C that are shown as appropriate in the drawings indicate, respectively, a rotation axis direction, rotation radial direction and rotation circumference direction of a spool. Where simply an axial direction, radial directions and a circumferential direction are referred to below without being particularly specified, these refer to the rotation axis direction, rotation radial directions and rotation circumference direction of the spool.

As shown in FIG. 1, a webbing take-up device 10 is equipped with a frame 12 fabricated of metal. The frame 12 is fixed to a pillar that structures a vehicle body framework of a vehicle, a seat cushion frame that structures a framework of a vehicle seat, or the like. The frame 12 is provided with a leg plate 12A and a leg plate 12B that are disposed to be spaced apart in the axial direction and oppose one another. Circular insertion holes 12C and 12D are formed in the leg plate 12A and leg plate 12B. Portions of a spool 14, which is described below, are inserted through the insertion holes 12C and 12D.

The spool 14 is fabricated of metal and formed in a substantially circular tube shape, the greater part of which is disposed between the leg plate 12A and leg plate 12B of the frame 12. An axle portion 14A is provided at an end portion at an axial direction other end side of the spool 14 (the opposite side from the direction of arrow Z). A bearing portion 18A is provided at a spring housing 18, which is described below. The axle portion 14A is supported at the bearing portion 18A via a spiral spring anchoring member 32. The spool 14 is further provided with a take-up portion 14B onto which a webbing 16 is taken up. The webbing 16 is formed in a long, narrow belt shape; a length direction base end portion of the webbing 16 is anchored at the take-up portion 14B. When the spool 14 is rotated in a take-up direction (the direction of arrow C), the webbing 16 is taken up onto the take-up portion 14B of the spool 14, starting from the length direction base end side thereof. When the webbing 16 is pulled out from the spool 14, the spool 14 is rotated in a pull-out direction (the opposite direction to arrow C). A torsion shaft insertion hole 14C is formed in an axial central portion of the spool 14. A torsion shaft 26, which is described below, is inserted into the torsion shaft insertion hole 14C. One axial direction side of the torsion shaft insertion hole 14C is open, and the other axial direction side of the torsion shaft insertion hole 14C is closed off.

A length direction distal end side of the webbing 16 extends from the spool 14 toward the vehicle upper side. The length direction distal end side of the webbing 16 passes through a slit hole formed in a through-anchor (not shown in the drawings) at the vehicle upper side of the frame 12, and is turned back toward the vehicle lower side.

The length direction distal end side of the webbing 16 is anchored at an anchor plate (not shown in the drawings). The anchor plate is formed of a metal plate of steel or the like, and is fixed to a floor portion of the vehicle (not shown in the drawings), a framework member of a seat (not shown in the drawings) corresponding with the present webbing take-up device 10, or the like.

A seatbelt device for a vehicle in which the present webbing take-up device 10 is employed is equipped with a buckle device (not shown in the drawings). The buckle device is provided at a vehicle width direction inner side of the seat at which the present webbing take-up device 10 is employed. In a state in which the webbing 16 is wrapped round the body of a vehicle occupant sitting on the seat, a tongue (not shown in the drawings) provided at the webbing 16 is engaged with the buckle device. Thus, the webbing 16 is applied to the body of the vehicle occupant.

The spring housing 18, which is fabricated of resin, includes the aforementioned bearing portion 18A. The spring housing 18 is provided at an outer face side of the leg plate 12A of the frame 12 (outside the frame 12). A spiral spring (not shown in the drawings) is provided inside the spring housing 18. One end portion of the spiral spring is anchored at the spiral spring anchoring member 32, which is fabricated of resin. The spool 14 is urged in the take-up direction (the direction of arrow C) by an urging force of the spiral spring.

Meanwhile, a lock mechanism 20 is provided at an outer face side of the leg plate 12B of the frame 12 (outside the frame 12). The lock mechanism 20 is provided with a lock base 22 fabricated of metal, which structures a portion of a rotor, and a lock pawl 28 fabricated of metal, which is supported at the lock base 22. The lock base 22 is provided coaxially with the spool 14 at one axial direction side relative to the spool 14. The lock base 22 is linked with the spool 14 via a connecting member 24 fabricated of metal, which structures another portion of the rotor, and the torsion shaft 26. Thus, the lock base 22 can be rotated integrally with the spool 14.

The lock mechanism 20 is equipped with a sensor apparatus (not shown in the drawings). The sensor apparatus is activated at a time of emergency of the vehicle, such as during a collision of the vehicle, during a sudden deceleration or the like. When the sensor apparatus is activated, rotation of the lock base 22 in the pull-out direction (the pull-out direction of the spool 14) is restricted, as is described in more detail below.

A cover plate 30 fabricated of metal is fixed to the leg plate 12B of the frame 12. The cover plate 30 and the leg plate 12B of the frame 12 form a rack accommodation portion 34, in which a large portion of the lock base 22 and the connecting member 24 are disposed.

The cover plate 30 is provided with a plate portion 30A, which is recessed toward the opposite side from the side thereof at which the frame 12 is disposed. The plate portion 30A is disposed to oppose the leg plate 12B of the frame 12 in the axial direction. A ratchet hole 30B is formed penetrating through the plate portion 30A. The lock base 22 of the lock mechanism 20 penetrates through the ratchet hole 30B of the cover plate 30. When the sensor apparatus of the lock mechanism 20 is activated and the lock pawl 28 attached to the lock base 22 moves to the radial direction outer side of the lock base 22, the lock pawl 28 meshes with ratchet teeth of the ratchet hole 30B of the cover plate 30. As a result, rotation of the lock base 22 in the pull-out direction is restricted. Hence, rotation in the pull-out direction of the spool 14 that is linked with the lock base 22 via the connecting member 24 and the torsion shaft 26 is restricted.

The webbing take-up device 10 is also equipped with the torsion shaft 26. The torsion shaft 26 is formed in a rod shape, is accommodated in the torsion shaft insertion hole 14C of the spool 14, and is arranged along the axial direction of the spool 14. An end portion 26A at one side of the torsion shaft 26 is anchored to the spool 14. An end portion 26B at another side of the torsion shaft 26 is anchored at the connecting member 24 and thus linked with the lock base 22. When rotation of the lock base 22 in the pull-out direction is being restricted, a length direction middle portion of the torsion shaft 26 is deformed by twisting. Thus, rotation of the webbing 16 in the pull-out direction of the spool 14 is tolerated.

Now, detailed structures of the lock base 22 and the connecting member 24 are described.

Meanwhile, a lock mechanism 20 is provided at an outer face side of the leg plate 12B of the frame 12 (outside the frame 12). With specific reference to FIGS. 1 and 2, the lock mechanism 20 includes a rotor 21. The lock mechanism 20 is provided with a lock base 22 fabricated of metal, which structures a first portion of the rotor 21, and a lock pawl 28 fabricated of metal, which is supported at the lock base 22. The lock base 22 is provided coaxially with the spool 14 at one axial direction side relative to the spool 14. The lock base 22 is linked with the spool 14 via a connecting member 24 fabricated of metal, which structures a second portion of the rotor 21, and the torsion shaft 26. Thus, the lock base 22 can be rotated integrally with the spool 14.

The lock base 22 is provided with a lock base-side tubular portion 22D that protrudes to another axial direction side from the lock base-side flange portion 22A. The lock base-side tubular portion 22D is formed such that an outer diameter of a radial direction outer side face thereof decreases toward the other axial direction side. A lock base-side spline 22E in a spline shape is formed at an inner periphery face of the lock base-side tubular portion 22D. The lock base 22 is further provided with plural lock base-side engaging teeth 22F that serve as engaging teeth and as first engaging teeth. The lock base-side engaging teeth 22F protrude to the radial direction outer side and the other axial direction side from the lock base-side tubular portion 22D and the lock base-side flange portion 22A, and are arranged at a predetermined spacing in the circumferential direction. A lock base-side core portion 22G is provided at an axial central portion of the lock base-side tubular portion 22D. The lock base-side core portion 22G is formed in a tubular shape with a larger diameter than the shaft portion 22C.

The connecting member 24 is provided with a connecting member-side flange portion 24A that serves as the base portion and as a second base portion. The connecting member-side flange portion 24A is formed in a circular plate shape that has a thickness direction in the axial direction and extends in the radial directions. The connecting member 24 is further provided with a torsion shaft engaging portion 24B formed in a circular tube shape. The torsion shaft engaging portion 24B protrudes to the other axial direction side from the connecting member-side flange portion 24A. A splineshaped torsion shaft engaging spline 24C is formed at an inner periphery face of the torsion shaft engaging portion 24B. The end portion 26B at the other side of the torsion shaft 26 engages with the torsion shaft engaging spline 24C.

The connecting member 24 is provided with a connecting member-side tubular portion 24D that protrudes to the one axial direction side from the connecting member-side flange portion 24A. The connecting member-side tubular portion 24D is formed such that an outer diameter of a radial direction outer side face thereof decreases toward the one axial direction side. A connecting member-side core portion 24F is provided at an inner periphery portion of the connecting member-side tubular portion 24D. A connecting member-side spline 24E in a spline shape is formed at the connecting member-side core portion 24F. The connecting member-side spline 24E protrudes to the one axial direction side and an outer periphery portion of the connecting member-side spline 24E engages with the lock base-side spline 22E of the lock base 22. An insertion hole 24G is formed in an axial central portion of the connecting member-side core portion 24F. The lock base-side core portion 22G of the lock base 22 is inserted into the insertion hole 24G. The lock base 22 and the connecting member 24 are joined to be integrally rotatable by the lock base-side core portion 22G of the lock base 22 being inserted into the insertion hole 24G of the connecting member-side core portion 24F and the connecting member-side spline 24E being engaged with the lock base-side spline 22E. In the present exemplary embodiment, the distal end portion of the lock base-side core portion 22G of the lock base 22 is crimped (flattened), such that the joining of the lock base 22 with the connecting member 24 will not disengage.

The connecting member 24 is further provided with plural connecting member-side engaging teeth 24H that serve as engaging teeth and as second engaging teeth. The connecting member-side engaging teeth 24H protrude to the radial direction outer side and the one axial direction side from the connecting member-side tubular portion 24D and the connecting member-side flange portion 24A, and are arranged at a predetermined spacing in the circumferential direction. In the state in which the lock base 22 and the connecting member 24 are joined, the connecting member-side engaging teeth 24H and the lock base-side engaging teeth 22F are disposed at matching positions in the circumferential direction. A rack 38 that serves as a moving member engages with the connecting member-side engaging teeth 24H and the lock base-side engaging teeth 22F. The rack 38 is formed in a rod shape of a softer material than the lock base 22 and the connecting member 24 (for example, a synthetic resin). The rack 38 is disposed inside a pipe, which is not shown in the drawings. At a time of emergency of the vehicle, the rack 38 is moved inside the pipe and inside the cover plate 30 (inside the rack accommodation portion 34) by pressure from gas generated by a micro gas generator, which is not shown in the drawings, and the rack 38 is engaged with the connecting member-side engaging teeth 24H and the lock base-side engaging teeth 22F. As a result, the lock base 22 and the connecting member 24 are rotated to one circumferential direction side (the side indicated by arrow C), and the spool 14 that is linked with the lock base 22 and the connecting member 24 via the torsion shaft 26 is rotated in the take-up direction.

Now, details of structures of the lock base-side engaging teeth 22F of the lock base 22 and the connecting member-side engaging teeth 24H of the connecting member 24, which are principal portions of the present exemplary embodiment, are described.

Figure 2:
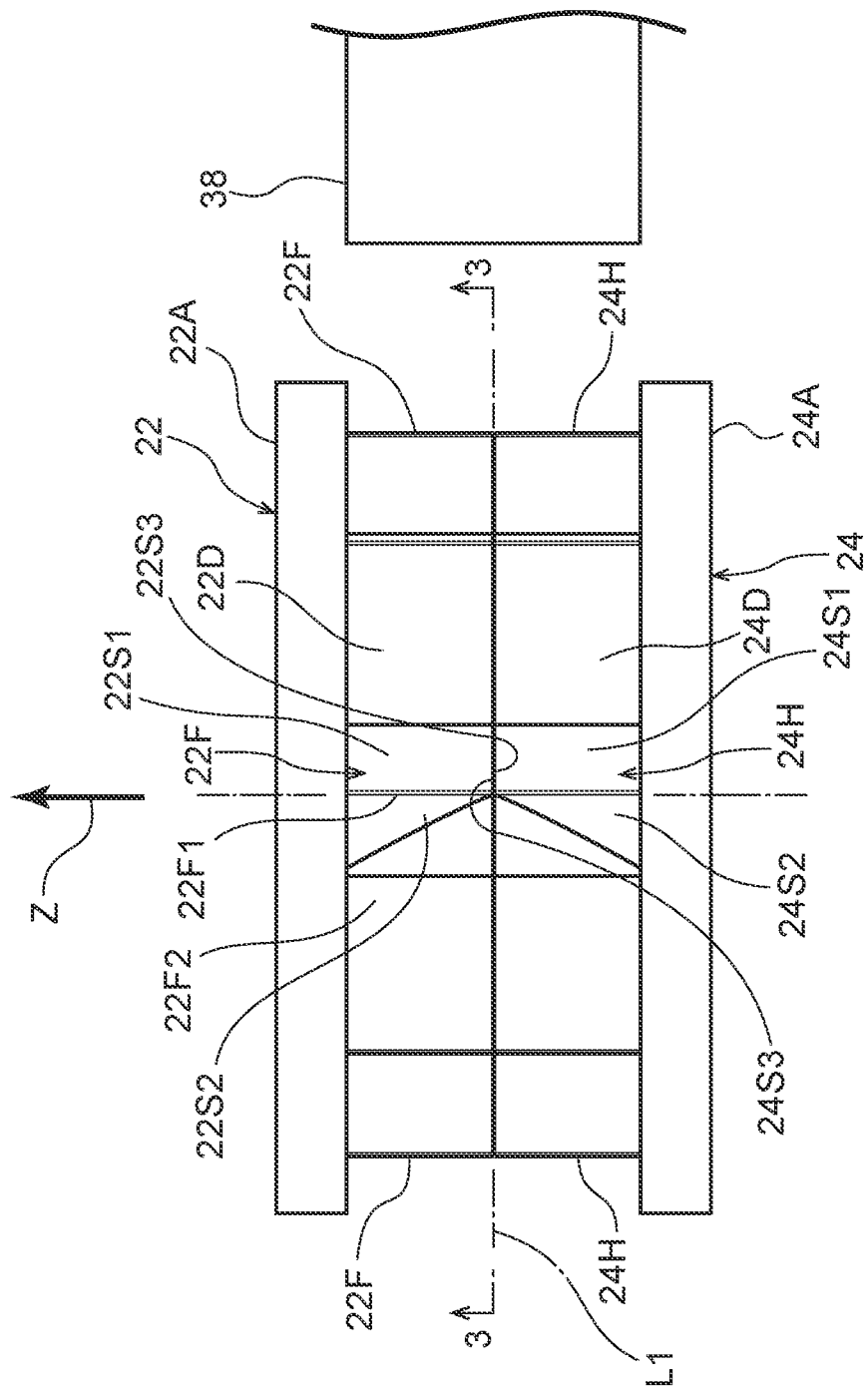
FIG. 2 is a side view schematically showing a connecting member and lock base seen from a rotation radial direction outer side.

FIG. 2 is a side view of the lock base 22 and the connecting member 24 in which thickness dimensions (dimensions in the circumferential direction) of the lock base-side engaging teeth 22F of the lock base 22 and the connecting member-side engaging teeth 24H of the connecting member 24 are exaggerated (i.e., the thicknesses are depicted as being thicker). As illustrated in FIG. 2, each lock base-side engaging tooth 22F and connecting member-side engaging tooth 24H is symmetrical about a bisecting line L1 that divides the lock base-side engaging tooth 22F and the connecting member-side engaging tooth 24H in half in the axial direction between the lock base-side flange portion 22A and the connecting member-side flange portion 24A.

Figure 3:
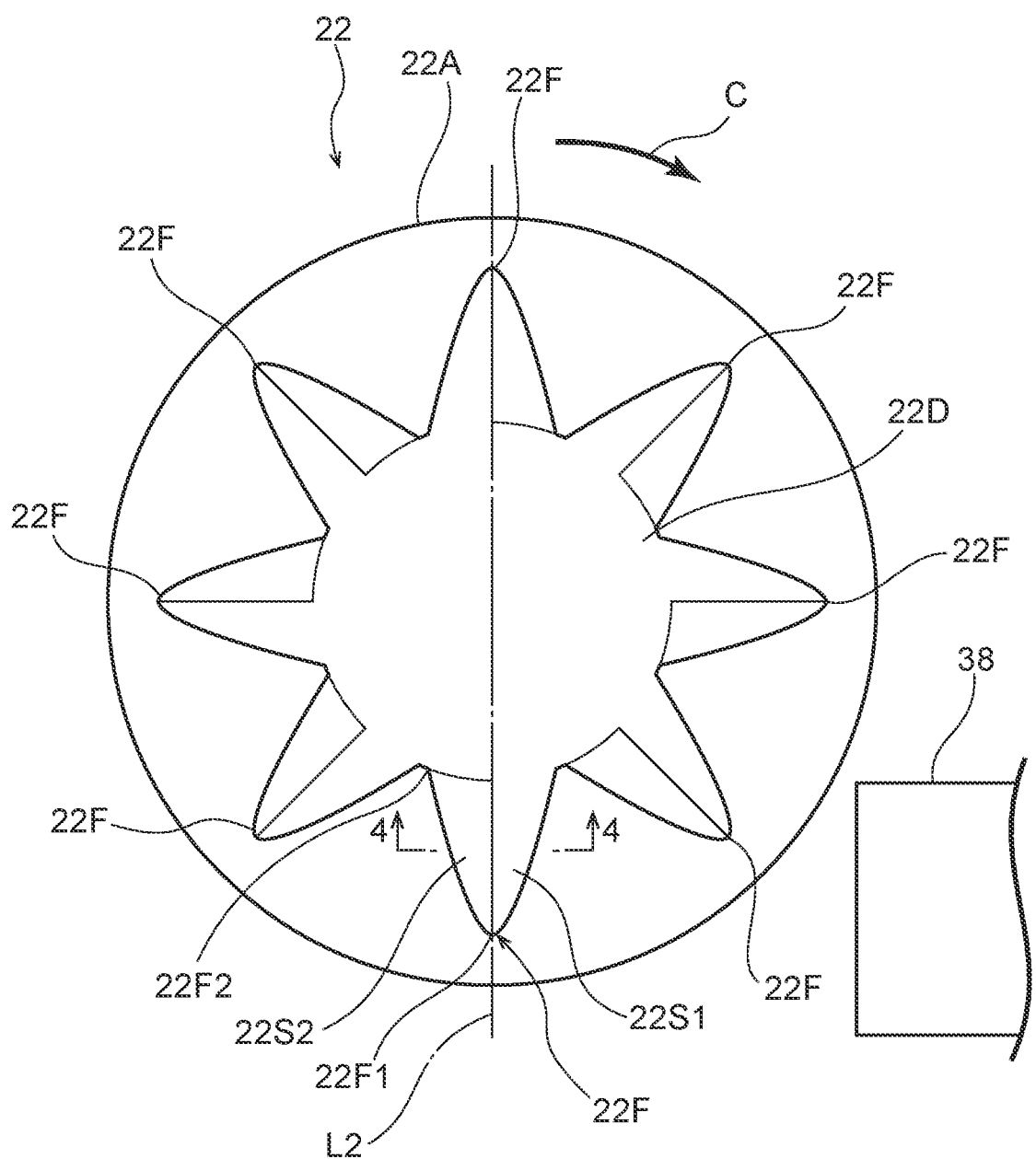
FIG. 3 is a sectional diagram showing a section in which the lock base is cut along line 3-3 in FIG. 2.
Figure 4:
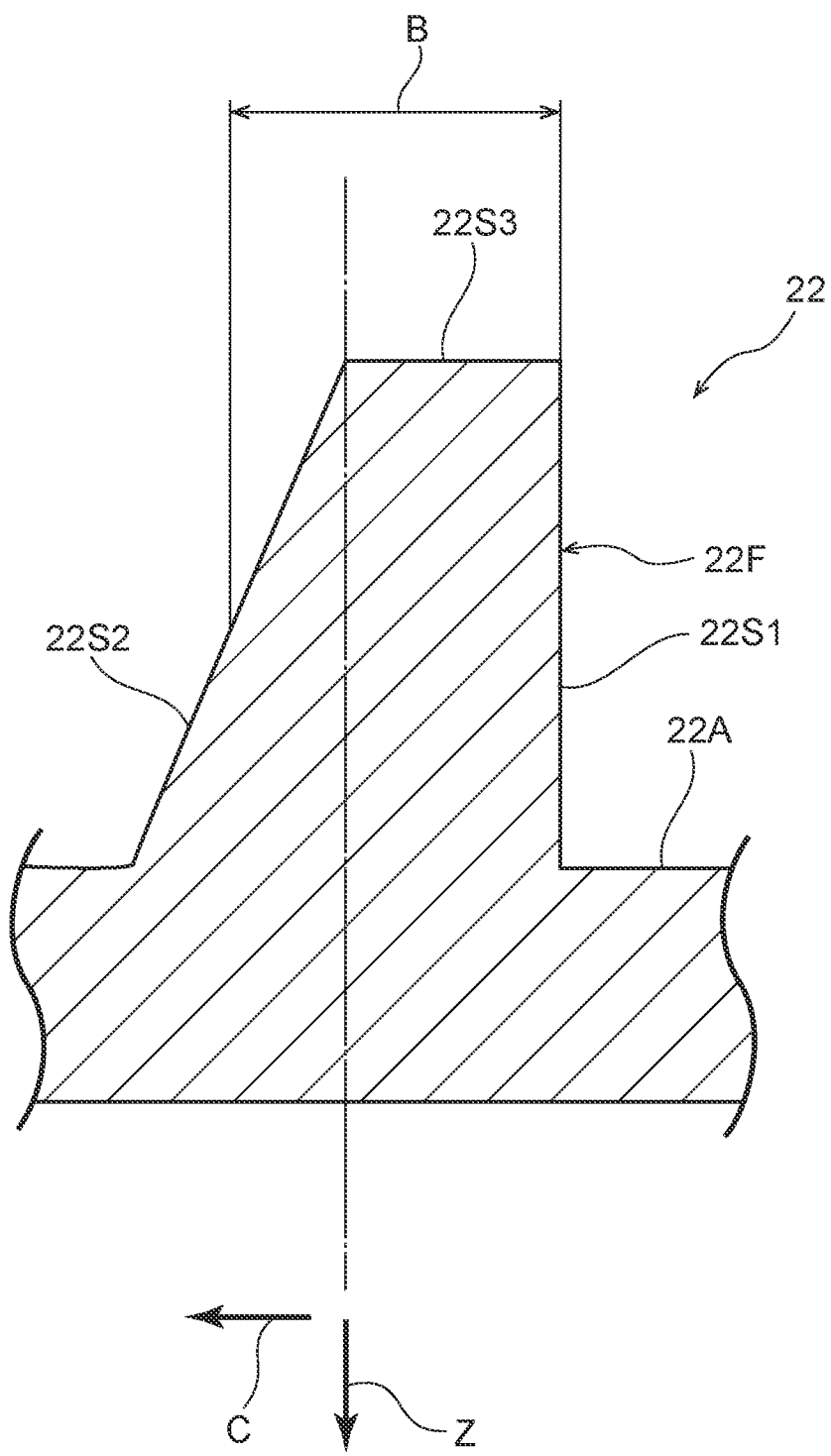
FIG. 4 is a sectional diagram showing a section of a lock base-side engaging tooth of the lock base, which is cut along line 4-4 in FIG. 3.

As shown in FIG. 3 and FIG. 4, in a sectional view cut along a plane intersecting the rotation center of the lock base 22 and a radial direction line L2 that passes through tooth tips 22F1 of the lock base-side engaging teeth 22F (the sectional view shown in FIG. 4), a surface 22S1 at another circumferential direction side of each lock base-side engaging tooth 22F (the surface at the side facing in the pull-out direction of the spool 14) extends in parallel with the axial direction. Also in this sectional view, a surface 22S2 at one circumferential direction side of the lock base-side engaging tooth 22F (the surface at the side facing in the take-up direction of the spool 14) is angled to the other circumferential direction side toward the other axial direction side. Therefore, a thickness dimension B of the lock base-side engaging tooth 22F steadily decreases toward the other axial direction side. In the present exemplary embodiment, because the surface 22S1 at the other circumferential direction side of the lock base-side engaging tooth 22F and the surface 22S2 at the one circumferential direction side of the lock base-side engaging tooth 22F are specified as described above in a section from a tooth base 22F2 to the tooth tip 22F1 of the lock base-side engaging tooth 22F, the thickness dimension B of the lock base-side engaging tooth 22F in this section steadily decreases toward the other axial direction side.

As described above, because the lock base-side engaging teeth 22F and connecting member-side engaging teeth 24H are formed to be symmetrical about the bisecting line L1 (see FIG. 2), no description is given for structures of each connecting member-side engaging tooth 24H. The surface 22S1 at the other circumferential direction side of the lock base-side engaging tooth 22F and the surface 22S2 at the one circumferential direction side of the lock base-side engaging tooth 22F correspond with a surface 24S1 at the other circumferential direction side of the connecting member-side engaging tooth 24H and a surface 24S2 at the one circumferential direction side of the connecting member-side engaging tooth 24H.

Figure 5:
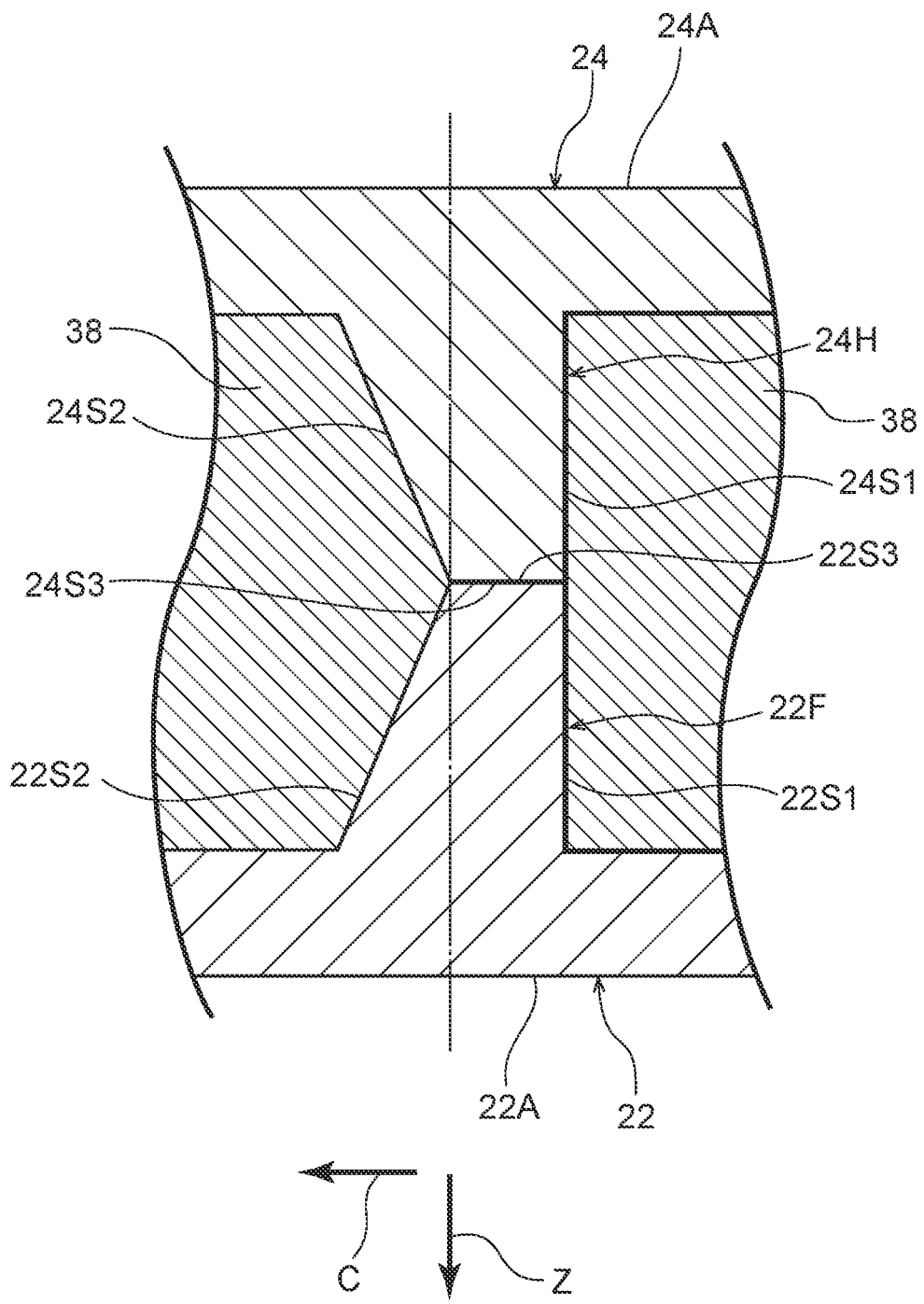
FIG. 5 is a sectional diagram corresponding to FIG. 4, showing a state in which a moving member is engaged with a connecting member-side engaging tooth of the connecting member and the lock base-side engaging tooth of the lock base.

As shown in FIG. 5, in the state in which the lock base 22 and the connecting member 24 are joined, an end surface 22S3 at the other axial direction side of the lock base-side engaging tooth 22F and an end surface 24S3 at the one axial direction side of the connecting member-side engaging tooth 24H abut together.

Operation of the Present Exemplary Embodiment

Now, operation of the present exemplary embodiment is described.

According to the webbing take-up device 10 according to the present exemplary embodiment as shown in FIG. 1, when the lock pawl 28 meshes with the ratchet teeth of the ratchet hole 30B during a collision of the vehicle, which is a mode of a time of emergency of the vehicle, rotation of the lock base 22 in the pull-out direction (the opposite direction to arrow C) is restricted.

When the micro gas generator, which is not shown in the drawings, is activated during the collision of the vehicle, high-pressure gas generated by the micro gas generator is instantaneously supplied into the pipe in which the rack 38 is disposed. The rack 38 is moved by the pressure of this gas and moves over the outer periphery face of the lock base-side tubular portion 22D of the lock base 22 and the outer periphery face of the connecting member-side tubular portion 24D of the connecting member 24.

When the rack 38 passes over the outer periphery face of the lock base-side tubular portion 22D of the lock base 22 and the outer periphery face of the connecting member-side tubular portion 24D of the connecting member 24, the lock base-side engaging teeth 22F of the lock base 22 and the connecting member-side engaging teeth 24H of the connecting member 24 bite into the rack 38, deforming portions of the rack 38. Thus, kinetic energy of the rack 38 may be transferred to the lock base 22 and the connecting member 24.

When the rack 38 moves in the state in which the lock base-side engaging teeth 22F of the lock base 22 and the connecting member-side engaging teeth 24H of the connecting member 24 are biting into the rack 38, as illustrated in FIG. 5, a portion of the rack 38 pushes the surface 22S1 at the other circumferential direction side of the lock base-side engaging tooth 22F and the surface 24S1 at the other circumferential direction side of the connecting member-side engaging tooth 24H toward the one circumferential direction side. As a result, the connecting member 24 and the lock base 22 rotate in the take-up direction (the direction of arrow C) together with the spool 14. Hence, the webbing 16 is taken up onto the take-up portion 14B of the spool 14 and a restraining force on the vehicle occupant from the webbing 16 is increased.

In the state in which rotation of the lock base 22 in the pull-out direction is restricted, as illustrated in FIG. 1, when the body of the vehicle occupant pulls on the webbing 16 and a rotary force on the spool 14 in the pull-out direction caused by this pulling force is greater than a torsion withstand load (a deformation withstand load) of the torsion shaft 26, the torsion shaft 26 twists (deforms). Therefore, rotation of the spool 14 in the pull-out direction is tolerated by the twisting of the torsion shaft 26, and pull-out of the webbing 16 from the spool 14 is tolerated. Thus, energy (kinetic energy of the vehicle occupant) corresponding to the amount of pull-out of the webbing 16 from the spool 14 is absorbed by the deformation of the torsion shaft 26.

In the present exemplary embodiment, as shown in FIG. 5, the thickness dimension B of each lock base-side engaging tooth 22F steadily decreases toward the other axial direction side, and the thickness dimension B of each connecting member-side engaging tooth 24H steadily decreases toward the one axial direction side. Therefore, a biting volume into the rack 38 of a portion at the other axial direction side of the lock base-side engaging tooth 22F may be made smaller, and a biting volume into the rack 38 of a portion at the one axial direction side of the connecting member-side engaging tooth 24H may be made smaller. Therefore, the resistance when the rack 38 is engaging with the lock base-side engaging teeth 22F and the connecting member-side engaging teeth 24H may be reduced, and kinetic energy of the rack 38 may be efficiently transferred to the connecting member 24 and the lock base 22. Thus, a reduction in rotary force of the spool 14 when the webbing 16 is being taken up onto the take-up portion 14B of the spool 14 may be suppressed. Accordingly, the output of the micro gas generator may be reduced and the wall of the pipe into which the gas from the micro gas generator is supplied may be made thinner. Consequently, the body of the webbing take-up device 10 may be reduced in size and costs may be lowered.

The thickness dimension B of each lock base-side engaging tooth 22F is specified so as to increase toward the side thereof at which the lock base-side flange portion 22A is disposed, and the thickness dimension B of each connecting member-side engaging tooth 24H is specified so as to increase toward the side thereof at which the connecting member-side flange portion 24A is disposed. Therefore, stresses generated at boundaries between the lock base-side engaging teeth 22F and the lock base-side flange portion 22A and at boundaries between the connecting member-side engaging teeth 24H and the connecting member-side flange portion 24A may be moderated even though the resistance when the rack 38 engages with the lock base-side engaging teeth 22F and the connecting member-side engaging teeth 24H is reduced.

In the present exemplary embodiment, the surface 22S1 at the other circumferential direction side of each lock base-side engaging tooth 22F and the surface 24S1 at the other circumferential direction side of each connecting member-side engaging tooth 24H extend in parallel with the axial direction. Therefore, the surface 22S1 at the other circumferential direction side of the lock base-side engaging tooth 22F and the surface 24S1 at the other circumferential direction side of the connecting member-side engaging tooth 24H may oppose the movement direction of the rack 38 substantially orthogonally. Thus, a reduction in the transmission efficiency of kinetic energy from the rack 38 to the lock base 22 and connecting member 24 may be even further suppressed.

In the present exemplary embodiment, each lock base-side engaging tooth 22F and connecting member-side engaging tooth 24H are formed to be symmetrical about the bisecting line L1 that divides the lock base-side engaging tooth 22F and connecting member-side engaging tooth 24H in half in the axial direction between the lock base-side flange portion 22A and the connecting member-side flange portion 24A. According to this structure, movement of the rack 38 in the axial direction when the rack 38 engages with the engaging teeth (the lock base-side engaging teeth 22F and the connecting member-side engaging teeth 24H) may be suppressed. Therefore, friction caused by contact between the rack 38 and the flange portions 22A and 24A may be prevented or reduced. Moreover, friction caused by contact of the flange portions with the cover plate 30 and the leg plate 12B of the frame 12 as a result of movement of the rack 38 may be prevented or reduced.

Figure 6:
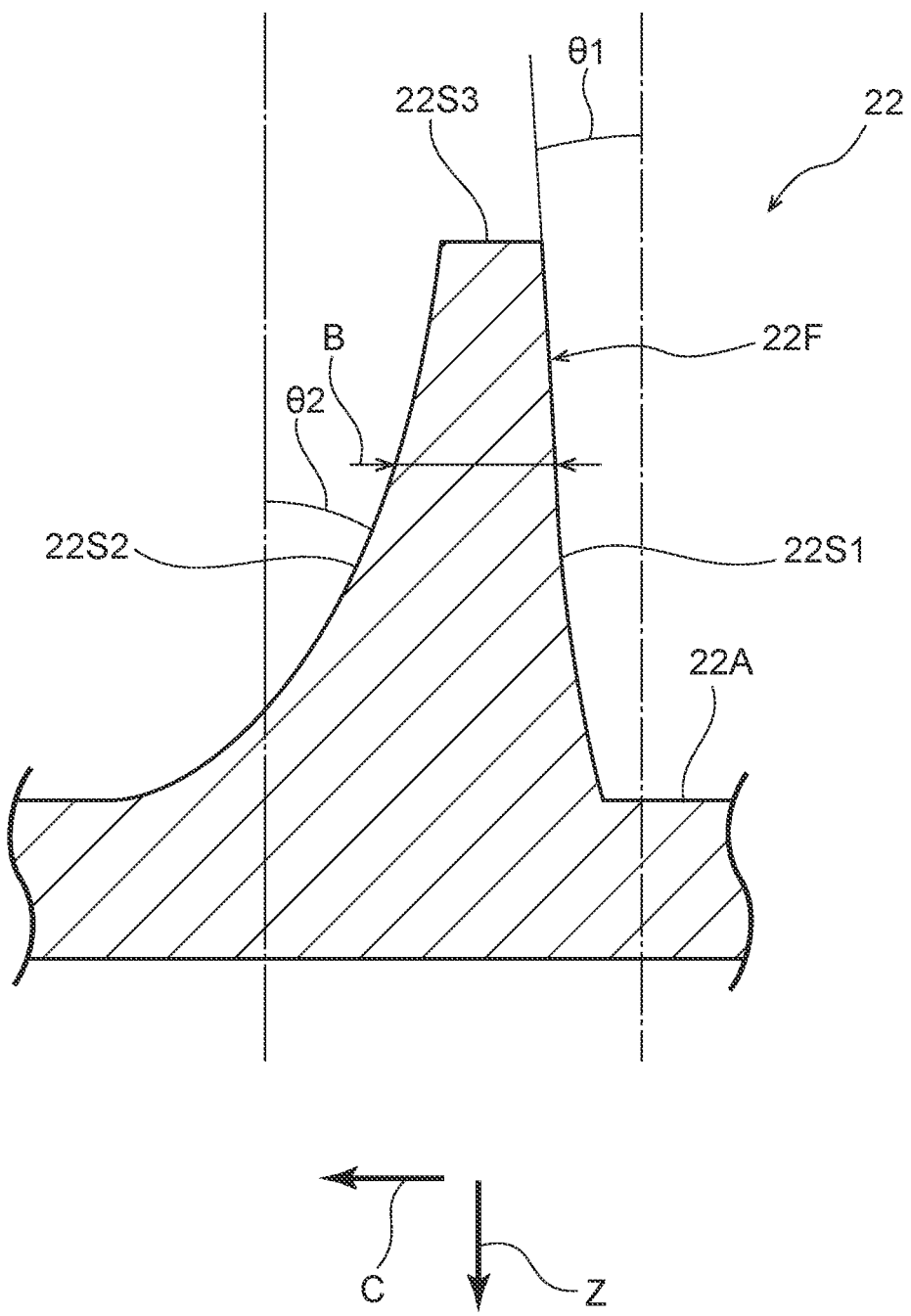
FIG. 6 is a sectional diagram corresponding to FIG. 4, showing a section of a lock base-side engaging tooth of a lock base according to an alternative embodiment.
Figure 7:
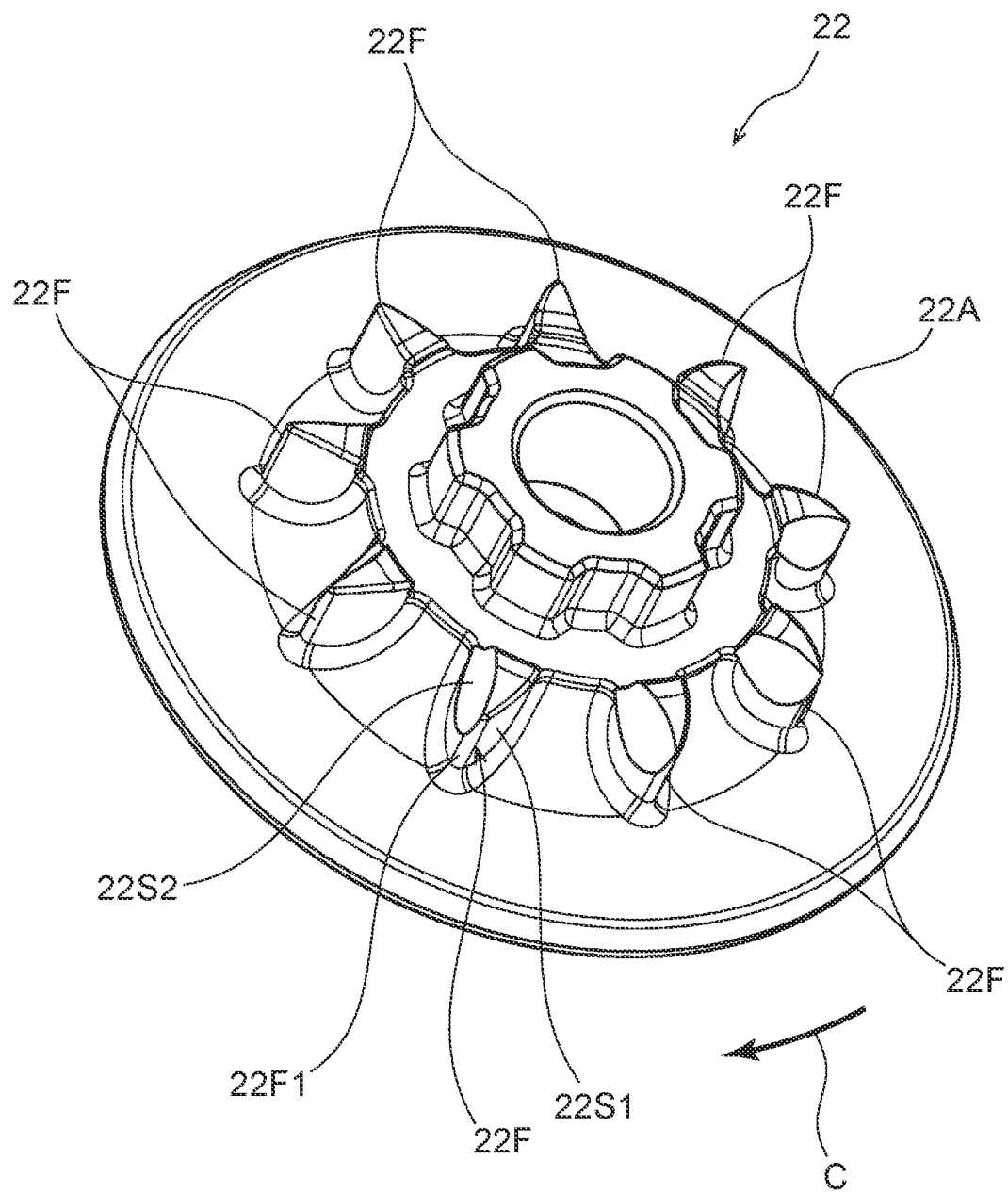
FIG. 7 is a perspective diagram showing a connecting member according to another alternative embodiment.

In the present exemplary embodiment, an example is described in which the surface 22S1 at the other circumferential direction side of each lock base-side engaging tooth 22F and the surface 24S1 at the other circumferential direction side of each connecting member-side engaging tooth 24H extend in parallel with the axial direction, but the present disclosure is not limited thus. For example, as illustrated in FIG. 6, it is sufficient that an inclination angle $\theta 1$ relative to the axial direction of the surfaces 22S1 and 24S1 at the other circumferential direction side of the lock base-side engaging tooth 22F and connecting member-side engaging tooth 24H be specified to be smaller than an inclination angle $\theta 2$ relative to the axial direction of the surfaces 22S2 and 24S2 at the one circumferential direction side of the lock base-side engaging tooth 22F and connecting member-side engaging tooth 24H. Consequent to this specification, stresses produced at boundaries between the lock base-side engaging teeth 22F and the lock base-side flange portion 22A and at boundaries between the connecting member-side engaging teeth 24H and the connecting member-side flange portion 24A may be moderated, and the resistance when the rack 38 is engaging with the lock base-side engaging teeth 22F and the connecting member-side engaging teeth 24H may be reduced. As illustrated in FIG. 7, a structure is possible in which the surfaces 22S2 and 24S2 at the one circumferential direction side of the lock base-side engaging tooth 22F and connecting member-side engaging tooth 24H are hollowed in recess shapes by portions at the one circumferential direction side of the lock base-side engaging tooth 22F and connecting member-side engaging tooth 24H being cut away in scoop shapes. According to this structure too, stresses produced at boundaries between the lock base-side engaging teeth 22F and the lock base-side flange portion 22A and at boundaries between the connecting member-side engaging teeth 24H and the connecting member-side flange portion 24A may be moderated, and the resistance when the rack 38 is engaging with the lock base-side engaging teeth 22F and the connecting member-side engaging teeth 24H may be reduced. Although only the lock base-side engaging teeth 22F of the lock base 22 are shown in FIG. 6 and FIG. 7, the connecting member-side engaging teeth 24H of the connecting member 24 that are not shown in these drawings are structured similarly to the lock base-side engaging teeth 22F.

In the present exemplary embodiment, an example is described in which the plural teeth that the rack 38 engages with (the lock base-side engaging teeth 22F and the connecting member-side engaging teeth 24H) are provided at both the lock base 22 and the connecting member 24, but the present disclosure is not limited thus. For example, a structure is possible in which the connecting member-side engaging teeth 24H at the connecting member 24 are not provided, and a structure is possible in which the lock base-side engaging teeth 22F at the lock base 22 are not provided.

An exemplary embodiment of the present disclosure is described hereabove. However, the present disclosure is not limited by these descriptions and it will be clear that numerous modifications beyond these descriptions may be embodied within a technical scope not departing from the gist of the disclosure.

The disclosures of Japanese Patent Application No. 2016-115595 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A webbing take-up device comprising:
a spool rotatable around an axis on which a webbing to be applied to a vehicle occupant is taken up as a result of the spool being rotated in a take-up direction, the spool being rotated in a pull-out direction as a result of the webbing being pulled out; and
a rotor on a side of the spool that is rotatable integrally with the spool around the axis, the rotor including a base portion that extends in radial directions around the axis of rotation of the spool and along the rotation axis of the spool, and an engaging tooth that protrudes from the base portion in either a rotation axis direction toward the spool or a rotation axis direction away from the spool, a thickness dimension in a rotation circumference direction of the engaging tooth being configured to become smaller along the rotation axis direction that the engaging tooth protrudes, the rotor being rotated as a result of a moving member being moved and engaged with the engaging tooth such that the spool is rotated in the take-up direction,
wherein the rotor includes a first rotor portion and a second rotor portion that are arranged to face each other along the rotation axis of the spool, and
wherein the base portion includes a first base portion formed at the first rotor portion and a second base portion formed at the second rotor portion that are spaced apart in the rotation axis direction of the spool; and the engaging tooth includes a first engaging tooth that protrudes from the first base portion to the second base portion, and a second engaging tooth that protrudes from the second base portion to the first base portion.

2. The webbing take-up device according to claim 1, wherein an inclination angle relative to the rotation axis direction of a surface of the engaging tooth is configured to be smaller at the side facing in the pull-out direction of the spool than at a side facing in the take-up direction of the spool.

3. The webbing take-up device according to claim 2, wherein the surface of the engaging tooth facing opposite to the pull-out direction of the spool is inclined in the axial direction such that the thickness dimension of the engaging tooth becomes smaller in the axial direction.

4. The webbing take-up device according to claim 3, wherein an end surface of the engaging tooth is orthogonal to the rotation axis direction of the spool, and wherein the end surface defines the smallest thickness dimension of the engaging tooth.

5. The webbing take-up device according to claim 1, wherein the surface of the engaging tooth at the side facing in the pull-out direction of the spool extends in parallel with the rotation axis direction of the spool.

6. The webbing take-up device according to claim 1, wherein the thickness dimension of the engaging tooth is configured to continuously become smaller along the rotation axis direction of the spool.

7. The webbing take-up device according to claim 6, wherein the thickness dimension of the engaging tooth is configured to linearly become smaller along the rotation axis direction of the spool.

* * * * *